United States Patent
Weng

Patent Number: 6,044,821
Date of Patent: Apr. 4, 2000

[54] DURABLE CYLINDER LINER AND METHOD OF MAKING THE LINER

[75] Inventor: Weibo Weng, Columbus, Ind.

[73] Assignee: Cummins Engine Company, Inc., Columbus, Ind.

[21] Appl. No.: 09/195,603

[22] Filed: Nov. 19, 1998

[51] Int. Cl.[7] .................................................. C23F 17/00
[52] U.S. Cl. ....................................................... 123/193.2
[58] Field of Search ...................... 123/193.2; 29/888.06, 29/888.061

[56] References Cited

U.S. PATENT DOCUMENTS

| | | |
|---|---|---|
| 982,739 | 1/1911 | Moore . |
| 1,512,570 | 10/1924 | Andrews . |
| 1,819,759 | 8/1931 | Valletta ................................. 123/193.2 |
| 1,836,798 | 12/1931 | Hefti . |
| 3,033,183 | 5/1962 | Erickson ............................... 123/193.2 |
| 3,452,914 | 7/1969 | Oberle et al. . |
| 5,701,861 | 12/1997 | Hegemier et al. .................... 123/193.2 |

FOREIGN PATENT DOCUMENTS

| | | |
|---|---|---|
| 2559129 | 7/1977 | Germany . |
| 797859 | 1/1981 | U.S.S.R. . |
| 2091153 | 7/1982 | United Kingdom . |

*Primary Examiner*—Marguerite McMahon
*Attorney, Agent, or Firm*—Nixon Peabody LLP; Charles M. Leedom, Jr.; Tim L. Brackett, Jr.

[57] ABSTRACT

An improved cylinder liner, and method for making the liner, is provided which includes a top section and a bottom section connected by a friction weld. The top section is formed from a material having a higher resistance to wear and/or a higher resistance to thermal distortion while the bottom section is formed of a less expensive material thereby minimizing costs while achieving a durable liner. A liner durability and cost optimizing arrangement is provided which limits the predetermined axial extent of the top section to an area corresponding to the greatest amount of mechanical and thermal loading thereby limiting material costs, maintaining structural integrity and maximizing durability. The method of the present invention creates an effective seamless connection between the top and bottom sections while permitting materials of different resistance properties to be utilized to maximize durability and minimize costs.

21 Claims, 2 Drawing Sheets

DURABLE CYLINDER LINER AND METHOD OF MAKING THE LINER

TECHNICAL FIELD

This invention relates to a cylinder liner for internal combustion engines, and particularly to a cylinder liner which is highly durable and a method of manufacturing the liner which is cost effective.

BACKGROUND OF THE INVENTION

Competitive pressures have increased the reliability and durability requirements for heavy duty diesel engines. In addition, performance and exhaust emission improvements have increased the thermal and mechanical loading on critical heavy duty diesel engine components. In particular, the loading on piston rings and thus cylinder liners has increased causing excessive wear.

Conventional cylinder liners are mounted in an engine cylinder to provide a smooth, durable surface for sealingly cooperating with piston rings to create a gaseous seal between the combustion chamber and the engine crankcase. Excessive loading over time results in undesirably rapid wear of the liner disadvantageously causing blow-by problems and requiring liner replacement thereby unnecessarily increasing costs. Conventionally, the wear resistance of liners has been improved by using a base material for forming the entire liner which has high wear resistance qualities. However, this strategy may sacrifice other important mechanical properties and/or significantly increase costs. Another possible improvement is to apply a wear resistant coating to the inner surface of the liner base material. However, this method significantly increases the costs of the manufacturing process due to the coating and the process of applying the coating.

U.S. Pat. Nos. 982,739 to Moore and 1,836,798 to Hefti each disclose cylinder liners formed of separate cylindrical parts which abut and engage in end-to-end relationship. However, the separate liner parts are not welded together. Moreover, these references no where suggest forming liner parts of different materials. U.S. Pat. No. 1,512,570 discloses a similar cylinder liner arrangement.

U.S. Pat. No. 3,452,914 to Oberle et al., Russian Patent No. 797,859 and German Patent No. 2559129 all disclose hollow cylindrical assemblies formed by end-to-end friction welding of cylindrical segments. However, the cylindrical assemblies are not cylinder liners.

U.K. Patent No. 2,091,153 discloses friction welding of workpieces formed of differing materials.

Consequently, there is a need for a durable cylinder liner for an internal combustion engine capable of effectively resisting wear and thermal distortion while maintaining structural integrity and a method for manufacturing the cylinder liner which minimizes the costs.

SUMMARY OF THE INVENTION

It is an object of the present invention, therefore, to overcome the disadvantages of the prior art and to provide a cylinder liner having high durability and reliability.

A further object of the present invention to provide a cylinder liner which is cost effective yet highly resistant to wear.

It is a further object of the present invention to provide a cylinder liner capable of handling high thermal loading while minimizing thermally induced distortion.

Yet another object of the present invention to provide a cylinder liner having high resistance to wear yet the desired mechanical strength.

A still further object of the present invention is to provide a cylinder liner which is more cost effective and more durable than existing conventional cylinder liners.

Another object of the present invention is to provide a cylinder liner which is formed of two or more blanks friction welded together.

These and other objects of the present invention are achieved by providing a cylinder liner for mounting in an internal combustion engine, comprising a top section formed of a first material having a first predetermined resistance to wear and a first predetermined resistance to thermal expansion, and a bottom section formed of a second material having a second predetermined resistance to wear and a second predetermined resistance to thermal expansion. Importantly, at least one of the second predetermined resistance to wear and the second predetermined resistance to thermal expansion is less than the respective one of the first predetermined resistance to wear and the first predetermined resistance to thermal expansion. A friction weld is used to connect the top section to the bottom section. The top section is generally cylindrically shaped and includes a lower distal annular portion. Likewise, the bottom section is preferably generally cylindrically shaped and includes an upper distal annular portion connected to the lower distal annular portion by the friction weld. Each of the sections includes a respective longitudinal extent and the cylinder liner may further include a liner durability and cost optimizing arrangement for minimizing the cost of the liner while increasing liner durability. The liner durability and cost optimizing arrangement includes the predetermined longitudinal extent of the top section being less than the predetermined longitudinal extent of the bottom section. For example, the predetermined longitudinal extent of the top section may be less than 50% of the predetermined longitudinal extent of the bottom section. More specifically, the predetermined longitudinal extent of the top section may be less than 50 mm, and preferably less than 35 mm. The first material of the top section may be high boron alloy cast iron while the second material of the bottom section may be grey iron.

The present invention is also directed to a cylinder liner for mounting in an internal combustion engine and for receiving a piston having one or more rings for movement through an upper reversal portion of a stroke and a lower reversal portion of a stroke, comprising a top section for positioning adjacent the upper reversal portion of the piston stroke wherein the top section is formed of a first material having a predetermined resistance property of a first predetermined magnitude and including a predetermined axial extent. The cylinder liner also includes a bottom section formed of a second material having the predetermined resistance property of a second predetermined magnitude different than the first predetermined magnitude. The bottom section includes a predetermined longitudinal extent greater than the predetermined longitudinal extent of the top section. The cylinder liner also includes a friction weld connecting the top section to the bottom section.

The present invention is also directed to a method of making a cylinder liner for an internal combustion engine, comprising the steps of providing a top section liner blank formed of a first material having a predetermined resistance property of a first predetermined magnitude, providing a bottom section liner blank formed of a second material having a predetermined resistance property of a second predetermined magnitude different than the first predetermined magnitude, and friction welding the top section liner blank to the bottom section liner blank to create a friction weld connecting the top section liner blank to the bottom section liner blank to form a unitary cylinder liner. The method may also include the step of machining the inner annular surface of the unitary cylinder liner.

DETAILED DESCRIPTION OF THE PREFERRED EMBODIMENT

Figure 1:
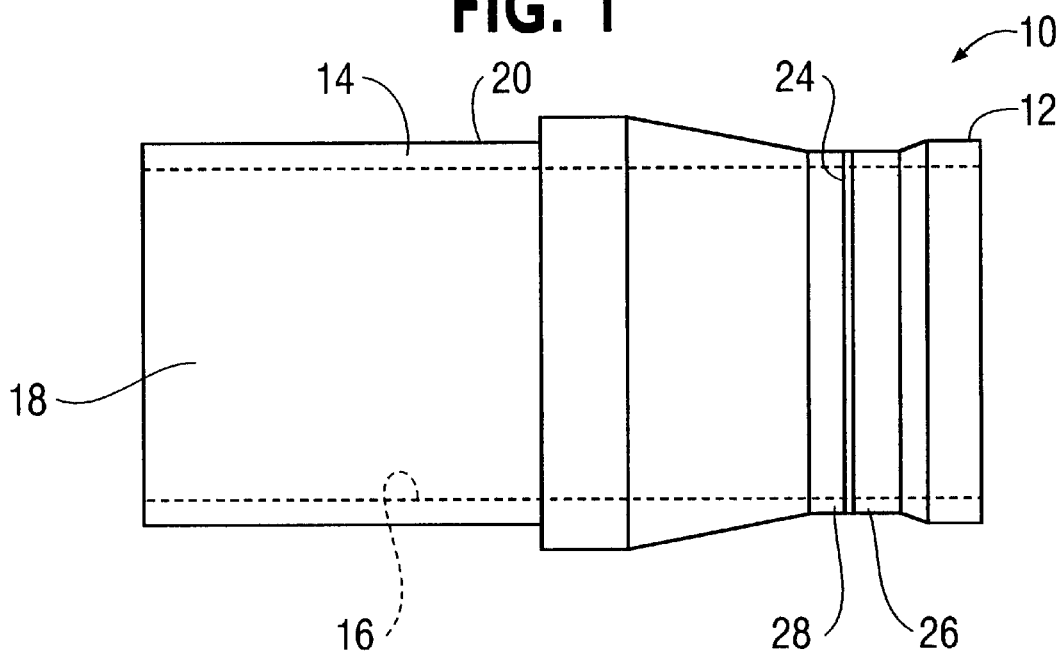
FIG. 1 is a side elevation view of the cylinder liner of the present invention.
Figure 2:
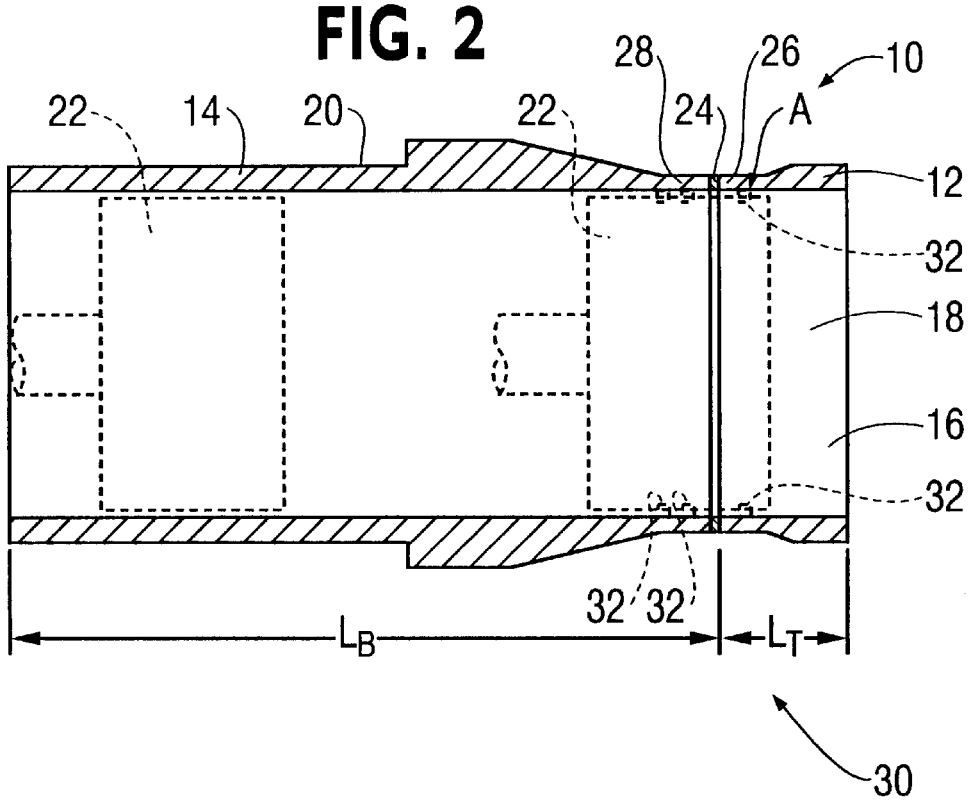
FIG. 2 is a side cross sectional view of the cylinder liner of FIG. 1.

Referring to FIGS. 1 and 2, there is shown the cylinder liner of the present invention, indicated generally at 10, manufactured by the method of the present invention for use in a cylinder bore of an internal combustion engine, i.e. diesel engine. Cylinder liner 10 generally includes a top section 12 and a bottom section 14 formed separately and friction welded together using the method of the present invention as described more fully hereinbelow. Cylinder liner 10 of the present invention provides improved resistance to wear and/or thermal distortion without significantly increasing costs and adversely affecting the structural integrity of the liner.

As shown in FIGS. 1 and 2, top section 12 and bottom section 14 form a generally cylindrically shaped liner 10 including an inner annular surface 16 defining a cylinder bore 18. Cylinder liner 10 also includes an outer surface 20 appropriately shaped with annular lands or ridges for secure mounting in the cylinder bore of an engine block (not shown). Cylinder bore 18 is sized to receive a complementary sized piston 22 (FIG. 2) mounted for reciprocal movement through various strokes.

Top section 12 and bottom section 14 are connected by a friction weld 24. Friction weld 24 forms a secure and reliable connection between top section 12 and bottom section 14 in a simple and cost effective manner while advantageously permitting an increase in liner durability, i.e. wear resistance, and/or a decrease in thermal distortion as discussed more fully hereinbelow. Specifically, friction weld 24 connects a lower distal annular portion 26 of top section 12 to an upper distal annular portion 28 formed on bottom section 14.

Importantly, the present invention includes the use of a different material for each section of liner 10 corresponding to the desired properties suitable for the corresponding section of the liner, i.e. wear resistance, thermal distortion resistance, structural integrity, cost considerations, etc. Friction weld 24 permits top section 12 and bottom section 14 to be formed of materials having the optimum respective properties suitable for the particular section of the liner while creating an effective, essentially seamless, connection between top section 12 and bottom section 14, in a cost effective manner. In the present embodiment, shown in FIGS. 1 and 2, top section 12 is formed of many durable materials having a high resistance to thermal distortion, i.e. a low coefficient of thermal expansion, and/or a high resistance to wear. For example, top section 12 may be formed of a material having a high resistance to wear relative to conventional grey cast iron. For example, the material of top section 12 may be a grey cast iron having a high boron composition, usually less than 0.1 wt. percent. Alternatively, top section 12 may be formed of a high or low alloy steel which has a low coefficient of thermal expansion thereby preventing thermal distortion at the upper end of cylinder liner 10 which is usually exposed to a higher operating temperature than bottom section 14 of the liner. Meanwhile, bottom section 14 may be formed of conventional grey cast iron having relatively lower wear resistance characteristics than the material forming top section 12 and/or a higher thermal expansion coefficient than top section 12. Of course, a coating may be applied to, or heat treatment performed on, inner annular surface 16 of both top section 12 and bottom section 14, regardless of the materials chosen as long as the material is capable of being treated, to further enhance resistance to wear and/or thermal distortion. It should also be noted that liner 10 may be formed of three or more separate sections/cylindrical parts friction welded together to permit further material selection and perhaps enhanced performance at different positions along the liner.

The use of two different materials for each section of liner 10 also significantly reduces costs in achieving higher durability/wear resistance and lower bore distortion by avoiding an expensive material for the entire liner. Conventionally, the durability of a cylinder liner is improved by either using a base material having higher wear resistance characteristics for the entire liner or coating the base material with wear resistant material. However, base materials having a higher wear resistance, such as a high boron grey cast iron, cost significantly more than a conventional base material, e.g. grey cast iron. Specifically, the present invention includes a liner durability and cost optimizing arrangement, indicated generally at 30, which includes top section 12 having a predetermined longitudinal axial extent or length $L_T$ providing enhanced wear resistance/durability and/or minimized bore distortion while minimizing cost. Specifically, the longitudinal extent $L_T$ of top section 12 is limited to that portion of liner 10 which is subject to the most significant wear during operation. As shown in FIG. 2, at least with respect to diesel engines, it has been shown that significant mechanical loading and thus the majority of wear occurs during an upper reversal portion A of a stroke by the compression ring or rings 32 of a piston 22, indicated generally at A, due to contact between the ring or rings and liner 10. That is, the upper reversal portion A is that portion of the stroke through which the rings 32 of piston 22 move just prior to and after the top dead center position. The mechanical loading on a cylinder liner during this portion of the stroke creates excessive wear to the liner over many cycles of operation and specifically to a well defined upper area of the liner. Also, the combustion chamber is formed near the top of the cylinder liner thereby exposing the top portion of a liner to extremely high temperatures possibly resulting in thermal distortion. The liner 10 of the present invention effectively resists wear and thermal distortion at the top of the liner by forming top section 12 of a material having a relatively increased resistance to wear and/or an increased resistance to thermal distortion in comparison to the material of bottom section 14, thereby creating a more durable and reliable cylinder liner. In addition, liner durability and cost optimizing arrangement 30 reduces the axial length of top section 12 so as to limit the extent of top section 12 to the location exposed to the conditions typically causing excessive wear and thermal distortion. Consequently, liner durability and cost optimizing arrangement 30 minimizes the cost of liner 10 by limiting the amount of the more expensive material used to form top section 12 while permitting a majority of liner 10, i.e. bottom section 14, to be formed from what is usually a less expensive material, i.e. grey cast iron. Thus, the predetermined longitudinal extent or length $L_B$ of bottom section 14 is significantly greater than the predetermined longitudinal extent $L_T$ Of top section 12. As a result, liner 10 of the present invention is highly durable, i.e. wear resistant and thermal distortion resistant, while being cost effective.

As shown in FIG. 2, the predetermined magnitude of the longitudinal extent $L_T$ of top section 12 is clearly not only less than the longitudinal extent $L_B$ of bottom section 14 but less than 50% of the longitudinal extent $L_B$ of bottom section 14. Preferably, the longitudinal extent $L_T$ of top section 12 is less than 50 mm in most applications. Specifically, Applicants have determined that, in at least one diesel engine application, the upper reversal area A begins no more than 20 mm from the top of the piston liner and extends for no more than 10 mm. Therefore, in at least this example application, top section 12 may be formed with a predetermined longitudinal extent $L_T$ having a magnitude no more than 30 mm in height. Top section 12 may be sized to encompass only one ring reversal portion, as shown in FIG. 2, or alternatively, be formed with a greater longitudinal extent $L_T$ to encompass two or more ring reversal portions. In this manner, a minimum amount of expensive material is used while still achieving optimum liner durability thereby avoiding significantly increased material costs.

Figure 3A:
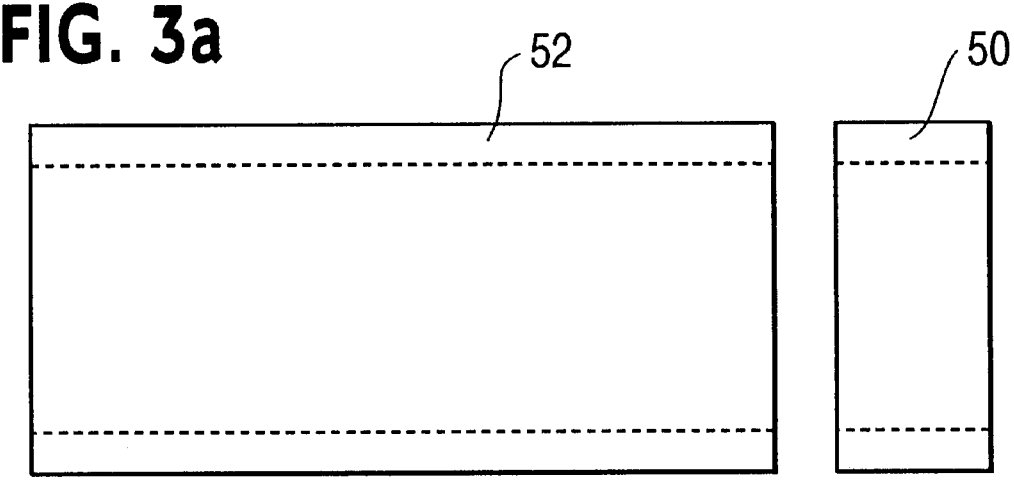
FIGS. 3a and 3b illustrate the steps of the method of the present invention for forming the cylinder liner from top and bottom section liner blanks using friction welding.
Figure 3B:
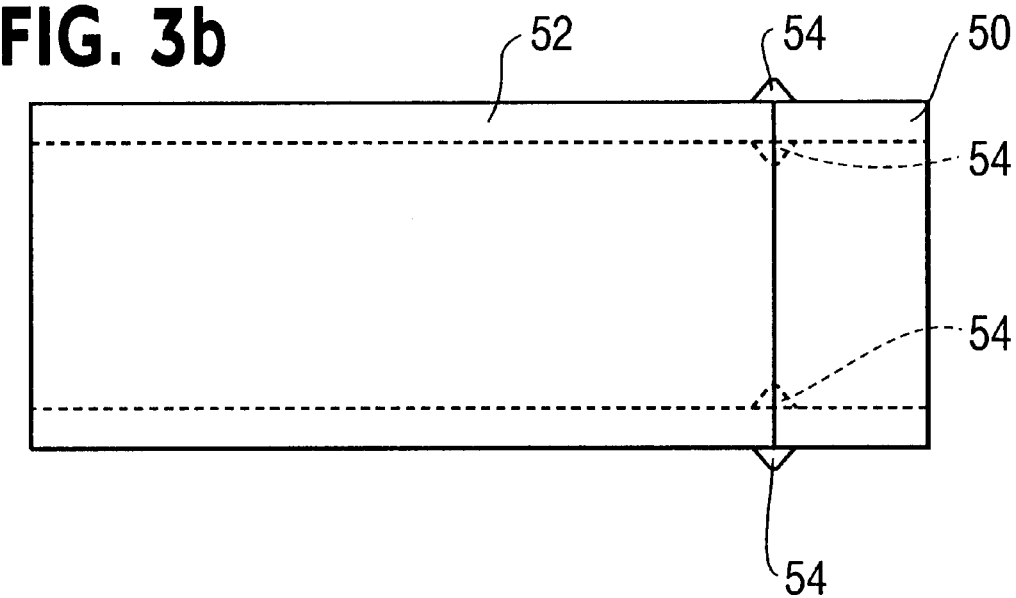

Now referring to FIGS. 3a and 3b, the present invention also includes a method for forming cylinder liner 10 which includes providing a top section liner blank 50 formed of a preselected material having a predetermined resistance property, e.g. wear resistance and/or thermal distortion resistance, and providing a bottom section liner blank 52 formed of a material having a predetermined resistance property of a magnitude different than the magnitude of the resistance property of the material of top section liner blank 50. Once the materials have been selected and the liner blanks 50, 52 cast, or formed in some other conventional manner, bottom section liner blank 52 and top section liner blank 50 are positioned in an end-to-end relationship as shown in FIG. 3a. For example, top section liner blank 50 may be formed of a grey cast iron having a high boron content whereas bottom section liner blank 52 may be formed of a conventional grey cast iron. As a result, top section liner blank 50 will be more resistant to wear and thermal distortion. Prior to friction welding, cylinder bore 18 may be formed either to an approximate predetermined diameter or to its final diameter. Likewise, outer surface 20 of each blank may be either machined to approximate final dimensions prior to friction welding so that final machining will occur after friction welding, or complete machining of the outer surface 20 may occur after friction welding. Once top section liner blank 50 and bottom section liner blank 52 are friction welded together as shown in FIG. 3b, a final machining process is performed on inner annular surface 16 to either achieve the final dimensions or simply hone the surface to remove excess material 54 resulting from the friction welding process. Likewise, outer surface 20 is then machined to form the appropriate grooves and lands perhaps necessary for mounting or cooling purposes, while also removing excess material from the outer surface. Consequently, the method of making cylinder liner 10 of the present invention results in a unitary cylinder liner comprised of integral sections formed of selected respective materials having different resistant properties necessary to optimize the durability and cost of the liner.

INDUSTRIAL APPLICABILITY

The cylinder liner of the present invention may be used in any internal combustion engine wherein optimum resistance to wear and thermal distortion is desired while achieving cost effectiveness.

I claim:

1. A cylinder liner for mounting in an internal combustion engine, comprising:

a top section formed of a first material having a first predetermined resistance to wear and a first predetermined resistance to thermal expansion;

a bottom section formed of a second material having a second predetermined resistance to wear and a second predetermined resistance to thermal expansion, wherein at least one of said second predetermined resistance to wear and said second predetermined resistance to thermal expansion is less than the respective one of said first predetermined resistance to wear and said first predetermined resistance to thermal expansion; and a friction weld connecting said top section to said bottom section.

2. The liner of claim 1, wherein said top section is generally cylindrically shaped and includes a lower distal annular portion, said bottom section being generally cylindrically shaped and including an upper distal annular portion, said lower distal annular portion connected to said upper distal annular portion by said friction weld.

3. The liner of claim 1, wherein said bottom section includes a predetermined longitudinal extent and said top section includes a predetermined longitudinal extent less than said predetermined longitudinal extent of said bottom section.

4. The liner of claim 3, wherein said predetermined longitudinal extent of said top section is less than 50% of said predetermined longitudinal extent of said bottom section.

5. The liner of claim 4, wherein said predetermined longitudinal extent of said top section is less than 50 mm.

6. The liner of claim 5, wherein said predetermined longitudinal extent of said top section is less than 35 mm.

7. The liner of claim 1, wherein said second predetermined resistance to wear is less than said first predetermined resistance to wear.

8. The liner of claim 7, wherein said first material is high boron cast iron and said second material is grey iron.

9. The liner of claim 1, wherein said bottom section includes a predetermined longitudinal extent and said top section includes a predetermined longitudinal extent, further including a liner durability and cost optimizing means for minimizing the cost of the liner while increasing liner durability, said liner durability and cost optimizing means including said predetermined longitudinal extent of said top section being less than said predetermined longitudinal extent of said bottom section.

10. The liner of claim 9, wherein said top section is generally cylindrically shaped and includes a lower distal annular portion, said bottom section being generally cylindrically shaped and including an upper distal annular portion, said lower distal annular portion connected to said upper distal annular portion by said friction weld.

11. The liner of claim 9, wherein said predetermined longitudinal extent of said top section is less than 50% of said predetermined longitudinal extent of said bottom section.

12. The liner of claim 10, wherein said predetermined longitudinal extent of said top section is less than 50 mm.

13. The liner of claim 11, wherein said predetermined longitudinal extent of said top section is less than 35 mm.

14. The liner of claim 9, wherein said predetermined resistance property of said first material and said predetermined resistance property of said second material is a resistance to wear, said first material being a high boron cast iron and said second material being grey iron.

15. The method of claim 14, wherein said bottom section liner blank includes a predetermined axial extent, said top section liner blank including a predetermined longitudinal extent less than said predetermined longitudinal extent of said bottom section liner blank.

16. The method of claim 14, wherein said unitary cylinder liner includes an inner annular surface, further including the step of machining said inner annular surface.

17. The method of claim 16, wherein said predetermined longitudinal extent of said top section liner blank is less than 50% of said predetermined longitudinal extent of said bottom section liner blank.

18. A cylinder liner for mounting in an internal combustion engine and for receiving a piston having one or more rings for movement through an upper reversal portion of a stroke and a lower reversal portion of a stroke, comprising:

a top section for positioning adjacent the upper reversal portion of the piston stroke, said top section formed of a first material having a predetermined resistance property of a first predetermined magnitude, said top section including a predetermined axial extent;

a bottom section formed of a second material having the predetermined resistance property of a second predetermined magnitude different than said first predetermined magnitude, said bottom section including a predetermined longitudinal extent greater than said predetermined longitudinal extent of said top section; and a friction weld connecting said top section to said bottom section.

19. A method of making a cylinder liner for an internal combustion engine, comprising the steps of:

providing a top section liner blank formed of a first material having a predetermined resistance property of a first predetermined magnitude;

providing a bottom section liner blank formed of a second material having the predetermined resistance property of a second predetermined magnitude different than said first predetermined magnitude; and friction welding said top section liner blank to said bottom section liner blank to create a friction weld connecting said top section liner blank to said bottom section liner blank to form a unitary cylinder liner.

20. The method of claim 19, wherein said top section liner blank is generally cylindrically shaped and includes a lower distal annular portion, said bottom section liner blank being generally cylindrically shaped and including an upper distal annular portion, said lower distal annular portion connected to said upper distal annular portion by said friction weld, wherein said predetermined resistance property of said first material and said predetermined resistance property of said second material is a resistance to wear, said first material being a high boron cast iron and said second material being grey iron.

21. The method of claim 20, wherein said predetermined longitudinal extent of said top section liner blank is less than 50 mm.

* * * * *